Patented July 31, 1928.

1,678,815

UNITED STATES PATENT OFFICE.

YOSHITARO KATAYAMA, OF SAN BERNARDINO, CALIFORNIA.

LIQUID CLEANING COMPOUND.

No Drawing.   Application filed July 7, 1927.  Serial No. 204,147.

The composition forming the subject-matter hereof, is intended for cleaning and polishing wood, metal and leather surfaces, and for cleaning painted and varnished surfaces, and the object is to provide an inexpensive cleaner which will accomplish the cleaning relatively quick and thoroughly, and without detriment to the object being cleaned, or discomfort to the hands of the user.

The composition hereinafter described is particularly rapid in action, and free from ingredients detrimental to paints or polished surfaces of metal, wood and stonework, and the composition is useful as a renovator for furniture, having ingredients efficient for cleaning, for producing a shiny or glossy surface, and having preservative elements.

In carrying the invention into effect, the composition consists of the following ingredients and proportions: solution of wild rhubarb root, 95%; cedar oil, 1%; and solution of alum, 4%.

To enable others to make and use my invention, I here describe the method of making it. I take one pound of wild rhubarb root and boil it in two gallons of water, and boil it until the solution has been reduced to three-fourths of two gallons. I then take out the roots from the water; and I then boil the remaining solution until it is reduced to one-half of a gallon. I then cool this solution. I then take powdered alum (potash alum) and saturate it with water. I then mix the oil and solutions together, and stir them thoroughly. The best way to use this composition is to take a soft rag and moisten the same with the compound, and then briskly rub the article to be cleaned with the said rag.

The wild rhubarb root solution is effective for cleaning. Any rhubarb root may be considered an equivalent of the wild root. The cedar oil is effective to produce a shiny or glossy finish on the cleaned surface, and the alum is a preservative.

What I claim is:

A composition of matter consisting of wild rhubarb root solution, 95%; cedar oil, 1%; and alum solution 4%.

In testimony whereof, I hereunto affix my signature.

YOSHITARO KATAYAMA.